US009908343B2

(12) United States Patent
Martinez de Salinas Vazquez et al.

(10) Patent No.: US 9,908,343 B2
(45) Date of Patent: Mar. 6, 2018

(54) CONTROL OF PRINTING SYSTEMS TO APPLY TREATMENT

(71) Applicants: Jorge Martinez De Salinas Vazquez, Barcelona (ES); Lluis Abello, Barcelona (ES); Ronald Burns, San Diego, CA (US)

(72) Inventors: Jorge Martinez de Salinas Vazquez, Sunnyvale, CA (US); Lluis Abello Rosello, Tarragona (ES); Ronald Burns, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/650,463

(22) PCT Filed: Dec. 15, 2012

(86) PCT No.: PCT/EP2012/075677

§ 371 (c)(1),
(2) Date: Jun. 8, 2015

(87) PCT Pub. No.: WO2014/090345

PCT Pub. Date: Jun. 19, 2014

(65) Prior Publication Data

US 2015/0321487 A1 Nov. 12, 2015

(51) Int. Cl.

*B41J 2/21* (2006.01)
*B41J 11/00* (2006.01)
*H04N 1/23* (2006.01)

(52) U.S. Cl.

CPC ............ *B41J 11/002* (2013.01); *B41J 2/2114* (2013.01)

(58) Field of Classification Search

CPC ..... B41J 11/002; B41J 11/0015; B41J 2/2114; B41J 2/2117; G03G 9/08; G06T 5/20; G06K 14/1867; G06K 14/1872; G06K 14/1876

See application file for complete search history.

(56) References Cited

U.S. PATENT DOCUMENTS

| | | | |
|---|---|---|---|
| 6,539,161 B2 | 3/2003 | Itaya | |
| 6,598,965 B1 | 7/2003 | Lund et al. | |
| 6,986,977 B2 | 1/2006 | Ishii et al. | |
| 9,096,052 B2 | 8/2015 | Gila et al. | |
| 2006/0071991 A1 | 4/2006 | Yamanobe | |
| 2006/0284929 A1 | 12/2006 | Matsuzawa | |
| 2007/0013759 A1 * | 1/2007 | Kadomatsu | B41J 2/2114 347/102 |

(Continued)

FOREIGN PATENT DOCUMENTS

| | | |
|---|---|---|
| CN | 1663233 | 8/2005 |
| CN | 101689300 | 3/2010 |

(Continued)

*Primary Examiner* — Patrick King

(74) *Attorney, Agent, or Firm* — HP Inc. Patent Department

(57) ABSTRACT

In some examples herein, control data is for application of treatment fluid on a treatment substrate location surrounding a substrate dot corresponding to a first pixel of the digital image. Treatment fluid is ejected on the treatment substrate location if a metric value computed from pixel values of a set of pixels in the neighborhood of the first pixel is above a threshold level.

10 Claims, 10 Drawing Sheets

(56) References Cited

U.S. PATENT DOCUMENTS

| | | | | |
|---|---|---|---|---|
| 2007/0019015 | A1 | 1/2007 | Tatsumi | |
| 2009/0262159 | A1* | 10/2009 | Lang | B41J 2/0057 347/15 |
| 2009/0315937 | A1 | 12/2009 | Kubota et al. | |
| 2010/0027906 | A1* | 2/2010 | Hara et al. | G06K 9/0061 382/167 |
| 2011/0157265 | A1* | 6/2011 | Itogawa | H04N 1/409 382/264 |
| 2011/0193902 | A1* | 8/2011 | Yamanobe | B41J 11/0015 347/9 |
| 2011/0210996 | A1* | 9/2011 | Itogawa | B41J 11/0015 347/9 |
| 2011/0303113 | A1 | 12/2011 | Sarkisian et al. | |
| 2012/0162718 | A1* | 6/2012 | Klaus | H04N 1/4051 358/3.06 |
| 2012/0242766 | A1* | 9/2012 | Kondo | B41J 2/2132 347/102 |
| 2012/0242767 | A1* | 9/2012 | Kondo | B41M 7/0081 347/102 |
| 2012/0313992 | A1 | 12/2012 | Wada | |
| 2013/0061767 | A1* | 3/2013 | Casals | B41M 1/14 101/202 |

FOREIGN PATENT DOCUMENTS

| | | |
|---|---|---|
| CN | 102144245 | 8/2011 |
| CN | 102815094 | 12/2012 |
| EP | 0887194 A2 | 12/1998 |
| JP | 2010791 | 9/1991 |
| JP | H08-052868 | 2/1996 |
| JP | H08-072233 | 3/1996 |
| JP | H0872233 | 3/1996 |
| JP | H11-010858 | 1/1999 |
| JP | 2006-102978 | 4/2006 |
| JP | 2007-276400 | 10/2007 |
| JP | 2010-000791 | 1/2010 |
| WO | WO-2004/069543 | 8/2004 |

* cited by examiner

CONTROL OF PRINTING SYSTEMS TO APPLY TREATMENT

BACKGROUND

In printing, treatment fluids may be applied for treating an ink on a substrate or for treating a substrate prior to receiving ink. Ink treatment may be, for example, to improve print quality by enhancing fixation of ink on the substrate or to protect ink on the substrate. Such a treatment may include, for example, a pre-treatment component (e.g., a fixer) or a post-treatment component (e.g., a coating).

For example, a pre-treatment may be applied on a portion of a substrate to enhance fixation (e.g., bonding and/or hardening) of an ink to be subsequently applied on that portion of the substrate. If the ink is deposited on the substrate via an ink fluid, fixation may be desired to address coalescence, bleed, feathering, or similar effects characterized by ink migration across a printed surface. In other examples, a post-treatment may be applied to ink already applied on the substrate. Such a post-treatment may be to provide a coating over ink deposited on the substrate.

Common methods for applying treatments on a substrate include roll coating, spray coating, manual application or treatment ejection, for example, through a jetting device. In an example of treatment application by a jetting device, a printing system may include a printhead including a treatment printhead unit for jetting a treatment fluid on a treatment substrate location.

BRIEF DESCRIPTION OF THE DRAWINGS

In order that the present disclosure may be well understood, various examples will now be described with reference to the following drawings.

DETAILED DESCRIPTION

Figure 1A:
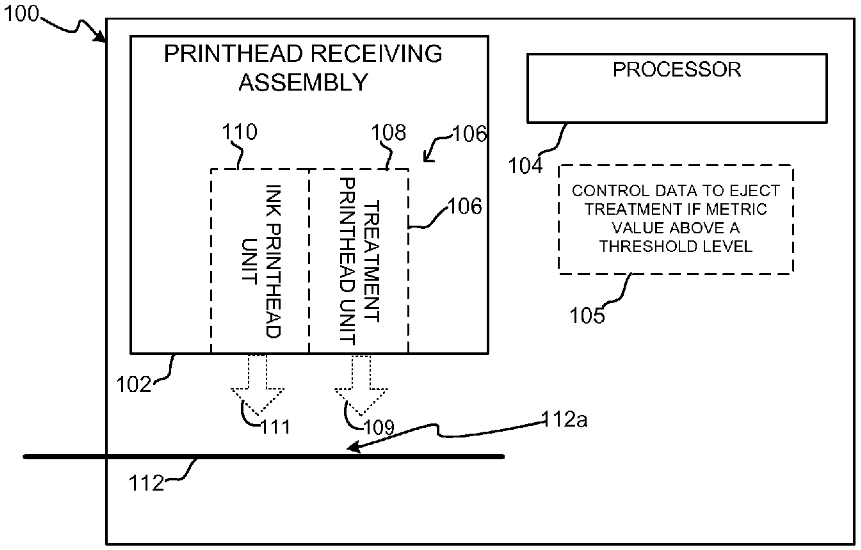
FIG. 1A is a block diagram schematically illustrating printing systems according to examples.

In the following description, numerous details are set forth to provide an understanding of the examples disclosed herein. However, it will be understood that the examples may be practiced without these details. While a limited number of examples have been disclosed, it should be understood that there are numerous modifications and variations therefrom.

As set forth above, in printing, treatment fluids may be applied for treating an ink on a substrate. For example, a printing system to print a digital image on a substrate may include a printhead including a treatment printhead unit for jetting a treatment fluid on a substrate. A digital image is composed of pixels. Each pixel of the digital image corresponds to a substrate dot (i.e., the substrate dot on which a reproduction of the pixel is to be printed).

A treatment fluid may be comprised of a treatment component and a carrier. In some examples herein, the treatment fluid is a fixer fluid, i.e., a fluid including a fixing component to reduce ink mobility on a substrate. A treatment fluid may also be a coating fluid, i.e., a fluid including a coating component to coat colorant when placed on a substrate.

A pixel can be seen as the smallest controllable element of a digital image. The number of pixels in a digital image is defined by the resolution of the digital image (for example 2, 4, or 6 megapixels). Each pixel is associated with a pixel value that defines pixel intensity. In color images, a pixel value generally has multiple components. For example, a pixel value may have three or four components intensities such as red, green, and blue, or cyan, magenta, yellow, and black. The pixel value of a specific pixel is used to determine the ink quantity to be received by a substrate dot corresponding to the specific pixel. Generally, the bigger the pixel intensity, the bigger the ink quantity to be received by a pixel.

Ink treatment may be associated with some problems such as edge sharpness or ink-treatment misalignment. To address such problems, it is generally advantageous to apply treatment to substrate dots that are adjacent to or close in proximity to substrate dots onto which ink is to be applied. Treatment dots adjacent to ink dots are defined as bloom dots, and the process of adding bloom dots around an inked region is referred to as blooming.

Applying a treatment to a substrate may, however, cause some undesirable effects. For example, applying too much treatment to each dot location can cause the substrate to warp or cockle. Further, treatment usage may also increase the cost per printed page (CPP) by an excess of treatment being used. Further, treatment usage might cause aerosol production that might impact elements in the printing system. (For example, if treatment is a fixer, generated aerosols might cause clogging of ink nozzles in the neighborhood of treatment nozzles.) Therefore, for at least some applications, it might be advantageous to reduce treatment usage.

It has been observed that for substrate locations being around a substrate dot to be printed with colorant, the substrate locations having relatively low ink densities, there might be no substantial benefit on applying a treatment thereon. More specifically, in such treatment substrate locations, there might be not enough colorant present for treatment to make a difference.

In order to facilitate an efficient treatment usage, in some examples herein, it is determined treatment to be applied on a treatment substrate location around a substrate dot corresponding to a first pixel. The treatment is determined based on pixel values of a set of pixels in the neighborhood of the first pixel. For example, treatment is to be applied if the sum of pixel values of pixels around the first pixel is higher than a certain threshold level. This may be used for performing a print operation in which the treatment printhead unit is to eject treatment fluid on the treatment substrate location if a set of substrate dots in the neighborhood of the first substrate dot is to receive an amount of colorant above a selected colorant level. Thereby, it is facilitated to bloom treatment substrate locations that result in a substantial enhancement, which enhances efficient use of treatment for printing.

Some examples herein can be seen as an application of treatment that is closer to a step function in treatment usage. The step function takes into account not only the quantity of ink to be applied on a specific substrate dot, but also the quantity of ink to be applied on substrate dots in a substrate location around the specific substrate dot. No treatment is applied if ink densities in the substrate area are low; treatment is applied if ink densities in the substrate area are above a certain threshold of ink quantity.

FIG. 1A is a block diagram schematically illustrating a printing system 100. Printing system 100 includes a printhead receiving assembly 102 and a processor 104. Printhead receiving assembly 102 is to receive a printhead 106. It will be understood that printing system 100 encompasses system configurations in which printhead 106 is not received into printhead receiving assembly 102 as well as configurations in which printhead 106 is mounted into printhead receiving assembly 102. Printhead 106 is shown to include a treatment printhead unit 108 for jetting a treatment fluid 109 on substrate 112 and, more specifically, on a treatment substrate location 112*a*. Printhead 106 is shown to further include an ink printhead unit 110 for jetting ink 111 on substrate 112 and, more specifically, on treatment substrate location 112*a*. (It will be understood that the printhead units can eject printing fluids in multiple treatment substrate locations for completing a printing job.)

Figure 2:
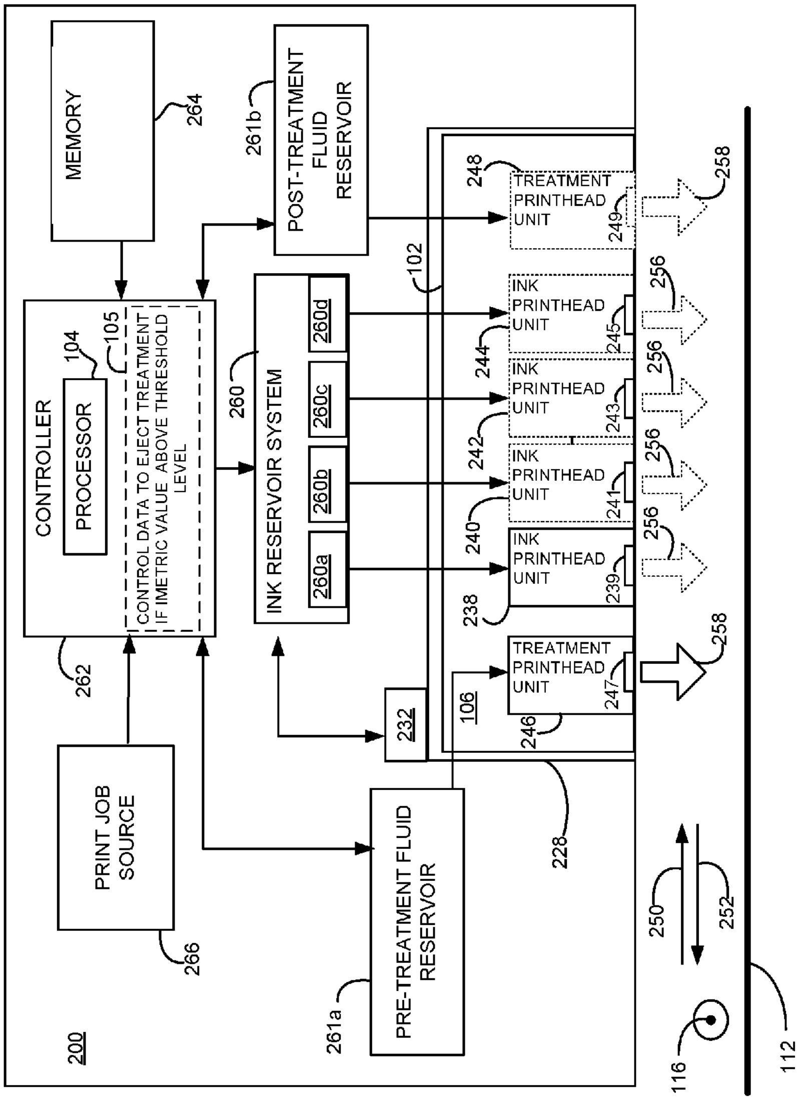
FIG. 2 is a block diagram schematically illustrating printing systems according to examples.

In order to apply ink and treatment in the same treatment substrate location, treatment printhead unit 108 and ink printhead unit 110 might be aligned along a printhead transition direction (see FIG. 2). During operation of such examples, the printhead units eject, sequentially, the printing fluids while the printhead units are translated above treatment substrate location 112*a*. In other examples, printhead 106 is a page-wide array printhead (such as the printheads implemented in an HP Inkjet Web Press). In page-wide array printheads, the printhead units are aligned along a substrate advance direction and continuously eject the printing fluids while the substrate is translated beneath the printhead units.

Processor 104 is control application of treatment fluid on treatment substrate location 112*a* surrounding a substrate dot 118. Substrate dot 118 corresponds to a first pixel of a digital image 114. (A specific example of treatment substrate location 112*a* surrounding substrate dot 118 is illustrated with respect to FIG. 1B.) Processor 104 may control treatment application by processing control data 105. Processor 104 may be responsible for generating control data 105. In other examples, control data 105 might be generated by another computing element, and processor 104 might receive control data 105 in order to perform the processing. Processor 104 may be communicatively coupled with a memory comprising instructions for implementing functionality described herein, as illustrated below with respect to FIGS. 2 and 3.

As used herein, control data 105 refers to any suitable set of data that can be processed by processor 104, or any other suitable processor, to apply treatment fluid in a specific manner. For example, control data may be embedded in image data by including treatment values associated with each pixel of the image. A treatment value of one might be then indicative of treatment to be applied in a substrate dot corresponding to the associated image pixel. A zero pixel value might then be indicative of no treatment. The treatment value might also be indicative of a quantity of treatment to be applied. For example, a pixel value for treatment might be a 2 bpp (bits per pixel) value. The quantity of treatment to be applied is proportional to the pixel value.

Figure 1B:
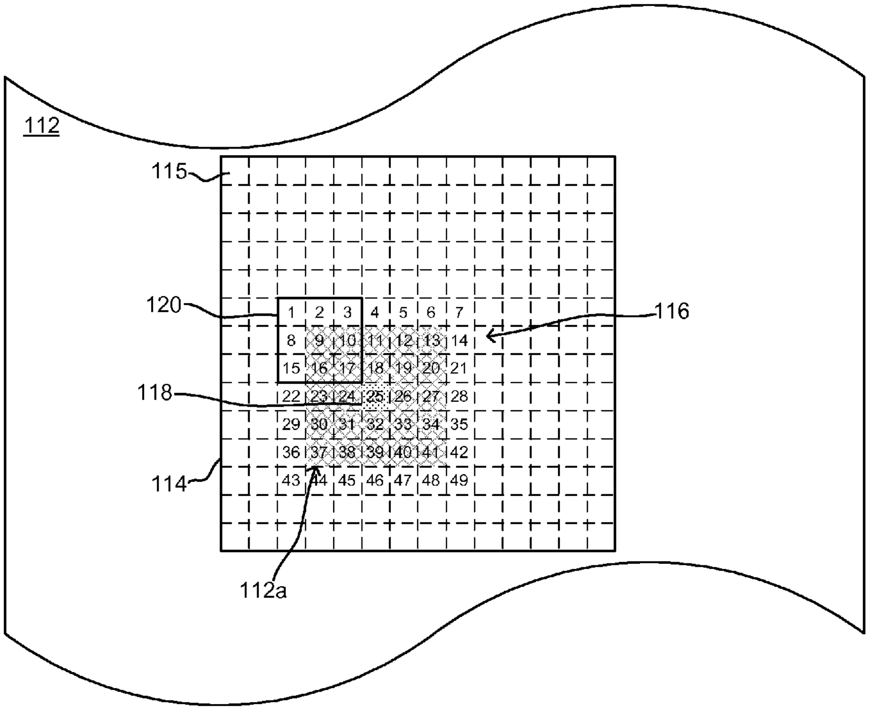
FIG. 1B is a schematic illustration of a substrate portion and a digital image to be reproduced thereon.

FIG. 1B is a schematic illustration of a portion of substrate 112 and digital image 114 to be reproduced thereon. Digital image 114 is comprised of a plurality of pixels 115. Each pixel 115 corresponds to a substrate dot, which in FIG. 1B is the substrate region overlapping with the corresponding pixel. Each pixel 115 is to be reproduced on the corresponding substrate dot by printing ink on the substrate dot based on an associated pixel value indicative of colorant amounts. It will be understood that how a pixel is reproduced on a corresponding treatment substrate location depends on the particularly used printing system. Pixel reproduction may involve reprographic techniques such as halftoning.

A window of 7×7 pixels 116 is labeled in FIG. 1B as pixels {1-49} for illustrating treatment application according to examples herein. Substrate dot 118 is illustrated at the center of pixel window 116 and corresponding to pixel {25}. Pixel {25} is used as an example of a "first pixel" as referred to above. Treatment substrate location 112*a* is illustrated as a cross-hatched substrate region corresponding to a 5×5 pixel window centered on the first pixel (i.e., pixel {25}).

It will be understood that the illustrated size and position of a treatment substrate location is merely illustrative. A treatment substrate location can have any size and position suitable for a specific application, such as an area corresponding to a pixel window with a 1×1, 3×3, 5×5, 7×7, 11×11 or even bigger pixel windows. A treatment substrate location might correspond to a rectangular pixel window with different number of pixels for different directions (e.g., a 2×3 window or 7×5 window). Further, the substrate location size must not exactly correspond to a size of a pixel window. For example, the substrate location size may correspond to a selected length such as a length of at least 1 mm or, more specifically, a length between 1 mm and 10 mm.

Referring back to the functionality of processor 104, treatment printhead unit 108 is to eject treatment fluid on treatment substrate location 112 if a set of substrate dots in the neighborhood of the first substrate dot is to receive an amount of colorant above a selected colorant level. The set of substrate dots may include dots corresponding to pixels in the neighborhood of a pixel to be printed, e.g. pixels set 120 in the neighborhood of pixel {25}.

There are a variety of procedures for establishing whether the amount of colorant is above a colorant level. A procedure for this is to compute a metric value from pixel values in the image data. For example, control data 105 may determine that treatment printhead unit 108 is to eject treatment fluid on the treatment substrate location if a metric value computed from pixel values of a set of pixels in the neighborhood of first pixel 118 is above a threshold level. Looking at FIG. 1B, the first pixel is illustrated as pixel {25} and the set of pixels is illustrated as set 120 comprised of a 3×3 window centered around pixel {9} (i.e., pixels {1-3, 8-10, 15-17}).

As used herein, a set of pixels in the neighborhood of a specific pixel refers to a group of pixel proximal to the specific pixel. For example, the set of pixels might be adjacent to the specific pixel used for evaluating treatment of a treatment substrate location as illustrated in FIG. 1B (pixel {17}, forming part of set 120 is adjacent to pixel {25}). In other examples, the set of pixels may be near to the specific pixel but not adjacent thereto, for example it might be separated by a distance of less than 4 pixels, 3 pixels, or 2 pixels. More specifically, the set of pixels may corresponds to a pixel window of at least 2×2 pixels, such as, but not limited to, a 2×3 window, a 3×3 window or even bigger windows.

A metric value can be computed from pixel set 120 to determine whether treatment is to be applied on substrate location 112*a*. In at least some examples herein, the metric value is associated with a colorant amount to be received in the substrate region corresponding to pixel set 120 and, more specifically, pixel intensity. For example, the metric value may be based on a sum of pixel values of the pixels in pixel set 120 (as set forth above, a pixel value is associated with the ink quantity to be received by a substrate dot corresponding to the specific pixel).

More specifically, generation of control data for treatment application may be performed by generating a treatment plane including values indicating fixer amounts to be applied at substrate dots corresponding to pixels in the treatment plane. A treatment plane can be generated by adding together the planes for the different colorants to be used in reproducing an image (each plane would include pixels with values indicating colorant to be applied into corresponding substrate dots). Thereby, each pixel in the treatment plane would have assigned a pixel value variable designated as FixerPixelValue. For example, a CMYK printing system may be operated using four colorant planes respectively corresponding to cyan, magenta, yellow and black colorants. This treatment plane can be generated by adding together the planes for the different colorants. The metric values can then be computed as follows:

$$\text{Metric Value}=\Sigma_{k=1}^{n}(\text{FixerPixelValue}),$$

wherein n is the number of pixels in the pixels set (e.g., n=9 for the example of FIG. 1B). In examples, the colorant plane pixels may be 1 bpp or 2 bpp (bits per pixel). In these examples, FixerPixelValue can be 0 of 1 in 1 bpp mode or 0, 1, 2, 3 in 2 bpp mode. It will be understood that there are a variety of options for computing metric values according to examples herein. For example, a metric value might be calculated by directly summing color values of the pixels.

Control data 105 may determine that region 112*a* is to receive treatment fluid is the metric value is above a certain threshold level. Generally, the threshold level corresponds to ink quantities that make effective applying a treatment. In other words, metric values lower than a certain ink quantity threshold reflect substrate regions into which applying a treatment does not convey a substantial effect for a specific print job; metric values higher than a certain ink quantity threshold reflect substrate regions into which applying a treatment conveys a substantial effect and therefore it is convenient to apply treatment thereon for enhancing print quality of a specific print job.

Processor 104 may compute an equivalent metric value for a plurality of pixel sets in the neighborhood of the first pixel. For example, referring to FIG. 1B, a metric value may be computed for each pixel in the edge of substrate portion 112*a* (e.g., pixels {9-13, 16, 20, 23, 27, 30, 34, 37-41}, each set corresponding to a 3×3 window centered on the respective edge pixel (i.e., thereby a total of 16 metric values may be computed). If at least one of the metric values is above a threshold level, then control data 105 may determine that treatment is to be applied to treatment substrate location 112*a*.

In the above example, establishing whether a set of substrate dots in the neighborhood of a first substrate dot is to receive an amount of colorant above a selected colorant level is performed based on the pixel values of a set of values corresponding to the set of substrate dots and a threshold level associated with the pixel values. It will be understood that there are a variety of manners of performing this establishing. Further, processor 104 may not be responsible for generating control data 115. Control data 115 may be provided as, for example, image data with treatment data embedded therein for the pixels in the image. Processor 104 may then process control data 115 for causing treatment printhead unit 108 to eject treatment fluid as described herein.

The same process described above can be performed for each pixel in image 114 to generate control data that specifies substrate locations into which treatment is to be applied. More details on how such control data 105 can be generated is set forth below with respect to FIGS. 4 to 8.

In the following, reference is made to FIG. 2 for illustrating a printing system 200, according to examples of implementations. FIG. 2 shows a block diagram of printing system 200. It will be understood that the following description of printing system 200 is merely illustrative and does not limit the components and functionality of printing systems according to the present disclosure.

As shown in the diagram, printing system 200 includes a carriage 228 with a printhead receiving assembly 102. In the illustrated example, printing system 200 is illustrated including printhead 106 in printhead receiving assembly 102. Carriage 228 is to transition printhead 106 across the width of substrate 112, i.e., along printhead transition directions 250, 252. Thereby, printing system 200 can perform printing across a width of substrate 112 via translation of carriage 228. In other examples, printheads 106 is a page-wide array printheads and translation is not required for printing across a width of substrate 112.

Printhead 106 in this example is illustrated to include a plurality of ink printhead units 238, 240, 242, 244. Each of the ink printhead units is configured to eject ink 256 of a different color via respective ink nozzle array arrangement 239, 241, 243, 245. Ink printhead units 238, 240, 242, 244 are fluidly connected to an ink reservoir system 260. Ink reservoir system 260 includes ink reservoirs 260*a*, 260*b*, 260*c*, 260*d* for providing ink to the respective ink printhead units. In the illustrated example, ink reservoirs 260*a*, 260*b*, 260*c*, 260*d* respectively store cyan ink, magenta ink, yellow ink, and black ink. Base colors are reproduced on substrate 112 by depositing a drop of one of the above mentioned inks onto a substrate location. Further, secondary colors can be reproduced by combining ink from different ink printhead units. In particular, secondary or shaded colors can be reproduced by depositing drops of different base colors on adjacent dot locations in the substrate location (the human eye interprets the color mixing as the secondary color or shading).

According to some examples herein, printing system 200 may include at least one printhead unit for ejecting a pre-treatment fluid and/or at least one printhead unit for ejecting a post-treatment fluid. In the example of FIG. 2, treatment printhead units 246, 248 are for treating a substrate location. Treatment printhead unit 246 is for applying a pre-treatment on the substrate location (e.g., a fixer) via a pre-treatment nozzle arrangement 247. Treatment printhead unit 246 is for applying a post-treatment on the substrate location (e.g., a coating) via a post-treatment nozzle arrangement 249.

The block diagram in FIG. 2 shows treatment printhead units 246, 248 fluidly connected to, respectively, a pre-treatment fluid reservoir 261*a* and a post-treatment fluid reservoir 261*b*. Treatment fluid reservoirs 261*a*, 261*b* are to store the treatment fluid to be jetted by treatment nozzles 247, 249. For example, pre-treatment fluid reservoir 261*a* may store a printing fluid comprised of an ink fixer component, and post-treatment fluid reservoir 261*b* may store a printing fluid comprised of a coating component. Ink reservoir system 260 and treatment fluid reservoirs 261*a*, 261*b* may include disposable cartridges (not shown). The reservoirs may be mounted on carriage 228 in a position adjacent to the respective printhead. In other configurations (also referred to as off-axis systems), the reservoirs are not mounted on carriage 228 and a small fluid supply (ink or treatment) is externally provided to the printhead units in carriage 228; main supplies for ink and fixer are then stored in the respective reservoirs. In an off-axis system, flexible conduits are used to convey the fluid from the off-axis main supplies to the corresponding printhead cartridge. Printheads and reservoirs may be combined into single units, which are commonly referred to as "pens".

It will be appreciated that examples can be realized with any number of printhead units depending on the design of the particular printing system, each printhead unit including a nozzle array for jetting a printing fluid such as ink or treatment. For example, printing system 200 may include at least one treatment printhead unit, such as two or more treatment printhead units. Furthermore, printing system 200 may include at least one ink printhead unit, such as two to six ink printhead units, or even more ink printhead units.

In the illustrated examples, ink printhead units are located at one side of a treatment printhead. It will be understood that ink printheads may be located at both sides of a treatment printhead. Further, printhead units might be monolithically integrated in printhead 106. Alternatively, each printhead unit might be modularly implemented in printhead 106 so that each printhead unit can be individually replaced. Further, printhead 106 may be a disposable printer element or a fixed printer element designed to last for the whole operating life of printing system 200.

Printing system 200 further includes a controller 262, which is operatively connected to the above described elements of printing system 200. Controller 262 is shown configured to execute a print job received from a printjob source 266 according to control data 105. Controller 262 is shown to include processor 104. Processor 104 is configured to execute methods as described herein.

Processor 104 may be implemented, for example, by one or more discrete modules (or data processing components) that are not limited to any particular hardware, firmware, or software (i.e., machine readable instructions) configuration. Processor 104 may be implemented in any computing or data processing environment, including in digital electronic circuitry, e.g., an application-specific integrated circuit, such as a digital signal processor (DSP) or in computer hardware, firmware, device driver, or software (i.e., machine readable instructions). In some implementations, the functionalities of the modules are combined into a single data processing component. In other versions, the respective functionalities of each of one or more of the modules are performed by a respective set of multiple data processing components.

Memory device 264 is accessible by controller 262 and, more specifically, by processor 104. Memory device 264 stores process instructions (e.g., machine-readable code, such as computer software) for implementing methods executed by controller 262 and, more specifically, by processor 104. Memory device 264 may be physically constituted analogously as memory 302 described below with respect to FIG. 3.

Controller 262 receives printjob commands and data from printjob source 266, which may be a computer or any other source of printjobs, in order to print an image. In the example, controller 262 is configured to determine a print mask from the received data. A print mask refers to logic that includes control data determining which nozzles of the different printheads are fired at a given time to eject fluid in order to reproduce a printjob. The print mask may be processed according to control data 105 by processor 104 in order to cause ejection of treatment according to examples herein. For example, control data 105 may form part of the print mask supplied by print job source 266. Alternatively, control data 105 might be implemented in the print mask by a pre-processing effected by processor 104 so that treatment is ejected as disclosed herein.

Controller 262 is operatively connected to treatment printhead units 246, 248, ink printhead units 238, 240, 242, 244, and the respective reservoirs to control, according to the print mask and the control data in memory 264. Thereby, controller 262, and more specifically processor 104, can control functionality of printing system 200 such as, but not limited to generate and/or process control data 105.

It will be understood that the functionality of memory 264 and print job source 266 might be combined in a single element or distributed in multiple elements. Further, memory 264 and print job source 266 may be provided as external elements of print system 200. Further, it will be understood that operation of processor 104 to control treatment ejection is not limited to the above examples.

Figure 3:
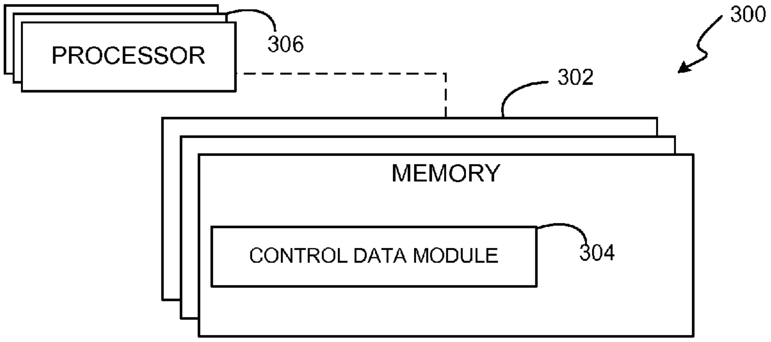
FIG. 3 is a block description of a system for generating control data to control printing systems according to examples.

FIG. 3 is a block description of a system 300 for generating control data to control printing systems (e.g., systems 100, 200) according to examples. As illustrated, system 300 includes programming comprised by processor executable instructions stored on a memory media 302 in the form of a control data module 304. System 300 may include hardware in the form of a processor 306 for executing instructions in control data module 304. Processor 306 may be constituted similarly as processor 104 illustrated above with respect to FIGS. 1A and 2. Memory 302 may be constituted by a tangible medium readable by processor 306. Memory 302 may be integrated in the same device as processor 306 or it may be separate but accessible to that processor 306. Each of memory 302 and processor 306 may be respectively integrated in a single system component or may be distributed among multiple system components.

Memory 302 can be said to store program instructions constituting control data module 304 that, when executed by processor 306, facilitate generate of control data as described herein. Additionally, or alternatively thereto, program instructions may be to store program instructions for implementing other functions such as, but not limited thereto, processing of control data as described herein, operation of a printing system to perform treatment as described herein, or determination of treatment to be applied on a treatment substrate location as described herein. The program instructions might be to generate a print mask that implements the control data to eject treatment as illustrated herein. Alternatively, or in addition thereto, the program instructions may be to modify a print mask to implements the control data to eject treatment as illustrated herein. Alternatively, or in addition thereto, the program instructions may be to generate or modify image data such that the image data includes treatment data, e.g., in the form of a treatment plane as illustrated above with respect to FIG. 1B.

In an example, the program instructions constituting control data module 304 can be part of an installation package that can be executed by processor 306 to implement control engine 108. In this case, memory 302 may be a portable medium such as a CD, DVD, or flash drive or a memory maintained by a server from which the installation package can be downloaded and installed. In another example, the program instructions may be part of an application or applications already installed. Here, memory 302 can include integrated memory such as a hard drive. It should be noted that a tangible medium as used herein is considered not to consist of a propagating signal. In examples, the medium is a non-transitory medium.

Figure 4:
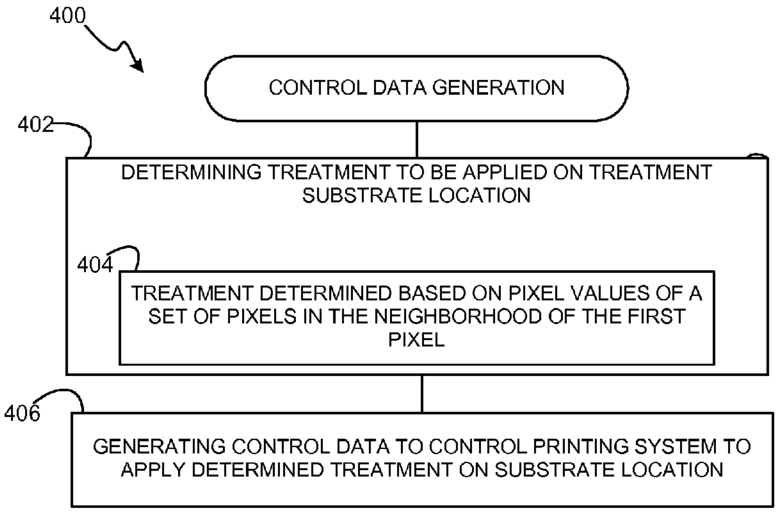
FIG. 4 is a flow chart that implements examples of methods for control data generation.

FIG. 4 shows a flow chart 400 that implements examples of methods for control data generation. Blocks in flow chart 400 may be implemented by process instructions stored on memory media 302, depicted in FIG. 3. Processor 104, depicted in FIGS. 1A and 2, or processor 306 may be responsible for executing blocks of flow chart 400. In discussing FIG. 4 reference is made to the diagram of FIG. 1B to provide a contextual examples. It will be understood that implementation, however, is not limited to those examples.

Flow chart 400 is to generate control data to control a printing system for printing a digital image 114 on substrate 112. Image 114 is comprised of pixels 115.

At block 402, a treatment to be applied on treatment substrate location 112*a* is determined. Treatment substrate location 112*a* is located around a substrate dot corresponding to a first pixel (e.g., pixel {25} in FIG. 1B) of pixels 115 of digital image 114.

As illustrated by sub-block 404, the treatment is determined based on pixel values of a set of pixels in the neighborhood of the first pixel. Referring to FIG. 1B, the set of pixels may correspond to set of pixels 120, which is located in the neighborhood of pixel {25}. The determination might be performed by computing a metric value as set forth above with respect to FIG. 1B. The metric value may be based, for example, on a sum of pixel values.

Treatment determination at block 402 might include establishing whether treatment is to be applied on treatment substrate location 112*a* by determining whether pixel values are above a threshold level. Additionally or alternatively thereto, treatment determination at block 402 might include establishing a quantity of treatment to be applied based on pixel values of the set of pixels. Such examples are more specifically illustrated with respect to FIG. 8A.

At block 406, control data (e.g., control data 105 depicted in FIG. 1A) is generated to control a printing system according to the treatment determined at block 402. Control data may be generated in different forms. For example, the control data may be in the form of image data to be processed by a printing system including a treatment plane generated based on the pixel values as described herein. Thereby, bloomed pixels (i.e., those indicative of locations where treatment is to be applied) may form part of image data to be processed by the printing system. Further, the control data may be in the form of a print mask generated from the image data. It will be understood that there are a variety of alternatives for implementing control data that can be processed to perform application of treatment as described herein.

The generated control data may correspond to data for applying the whole treatment associated with printing of a digital image. Further, the generation of control data may be performed in a single sequential processing of the pixels in the digital image, as illustrated with respect to FIG. 5.

Figure 5:
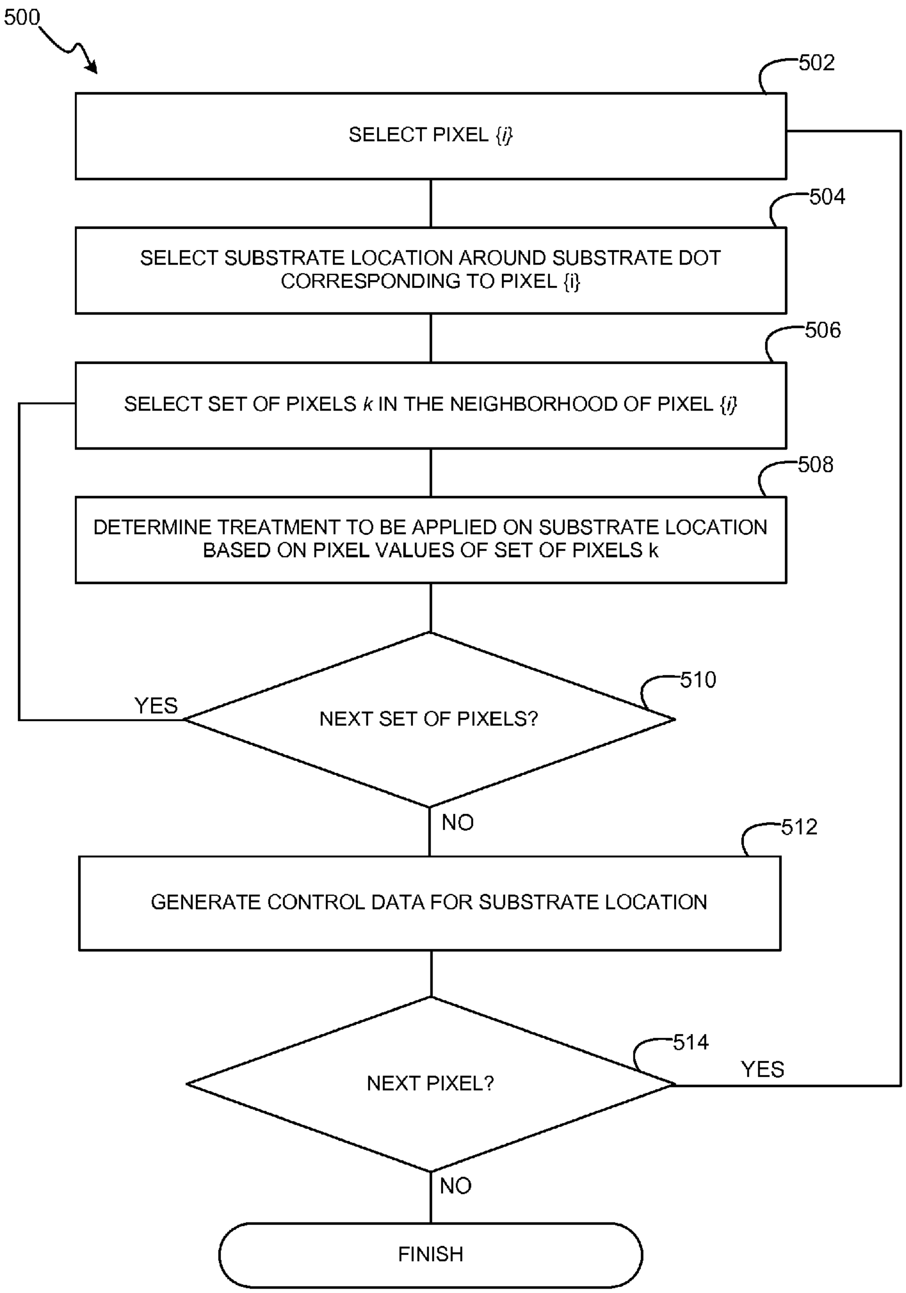
FIG. 5 is a flow chart that implements examples of methods for control data generation.

FIG. 5 shows a flow chart 500 that implements examples of methods for control data generation. Blocks in flow chart 500 may be implemented by process instructions stored on memory media 302, depicted in FIG. 3. Processor 104, depicted in FIGS. 1A and 2, or processor 306 may be responsible for executing blocks of flow chart 500. In discussing FIG. 4 reference is made to the diagram of FIG. 1B to provide a contextual example. It will be understood that implementation, however, is not limited to those examples.

Flow chart 500 is to generate control data to control a printing system for printing digital image 114 on substrate 112. Image 114 is comprised of pixels 115. At block 502, a pixel {i} is selected. Generally, flow chart 502 is to be performed for every pixel in an image. If digital image 114 is comprised of N pixels, flow chart 502 is to be executed for pixels 1 to N.

At block 504, a substrate location is selected around a substrate dot corresponding to pixel {i}. For example, in the processing illustrated in FIG. 1B, substrate location 112 is selected around the substrate dot corresponding to pixel {25}.

At block 506, a set of pixels k is selected in the neighborhood of pixel {i}. For example, in the processing illustrated in FIG. 1B, pixel set 120 is selected adjacent to pixel {25}.

At block 508, it is determined treatment to be applied on the substrate location based on pixel values of set of pixels k. Block 508 might be implemented similarly as block 402 illustrated above with respect to FIG. 4.

At block 510, it is decided whether another set of pixels is to be evaluated for determining treatment of the substrate location. The number of pixel sets to be evaluated for a substrate location depends on the specific application. In some examples, a single pixel set is evaluated. In the example illustrated below with respect to FIGS. 6 and 7 multiple pixel sets are evaluated for each substrate location. More specifically, a pixel set is computed for each substrate dot in the treatment substrate location.

If at block 510 it is decided that a further set of pixels is to be evaluated, then flow chart 500 goes back for executing blocks 506 and 508 with another pixel set. If at block 510 it is decided that all set of pixels have been evaluated, then flow chart 500 goes forward to block 510.

At block 512, control data (e.g., control data 105 depicted in FIG. 1A) is generated to control a printing system according to the treatment determined at block 508 for the substrate location selected at block 504.

At block 514, it is decided whether another pixel in the digital image is to be evaluated for treatment. If at block 514 it is decided that a further pixel is to be evaluated for treatment, then flow chart 500 goes back for executing blocks 502 to 514 with another pixel set. If at block 514 it is decided that all set of pixels have been evaluated for treatment, for example because blocks 504 to 512 have been performed for all pixels in the image, then flow chart 500 can be finished.

Figure 6:
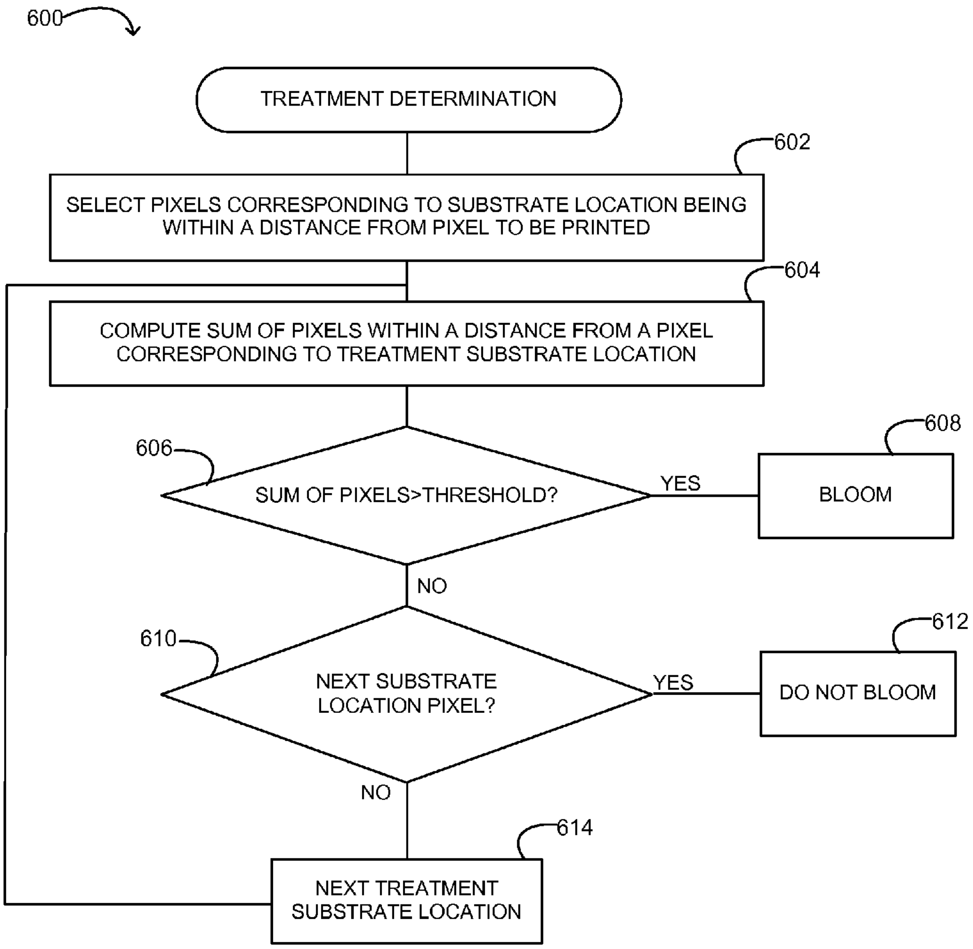
FIG. 6 is a flow chart that implements examples of methods for determining treatment.
Figure 7:
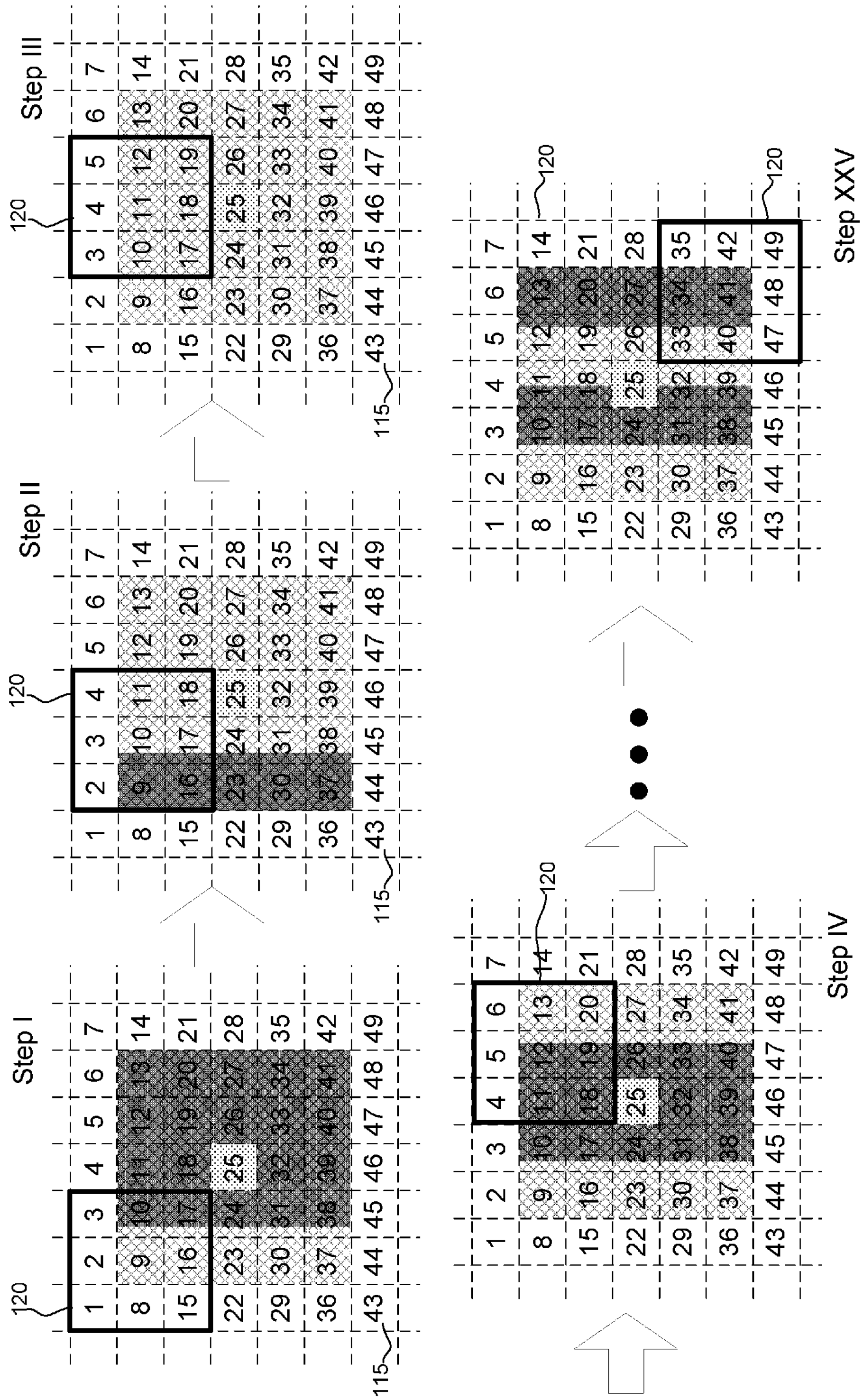
FIG. 7 is a diagram illustrating processing of pixels in digital images for determining treatment of a substrate location according to examples.

FIG. 6 shows a flow chart 600 that implements examples of methods for determining treatment. More specifically, flow chart 600 is for establishing whether treatment is to be applied on a treatment substrate location by determining whether pixel values are above a threshold level. Blocks in flow chart 600 may be implemented, for example, by process instructions stored on memory media 302, depicted in FIG. 3. Processor 104, depicted in FIGS. 1A and 2, or processor 306 may be responsible for executing blocks of flow chart 600. In discussing FIG. 6 reference is made to the diagram of FIG. 7 to provide contextual examples. FIG. 7 shows diagrams illustrating processing of pixels in a digital image for determining treatment of a substrate location. It will be understood that implementation, however, is not limited to those examples.

At block 602, pixels corresponding to a treatment substrate location are selected (these pixels are referred to in the following as substrate location pixels). The substrate location pixels are within a distance from the pixel to be printed. In some examples herein, as illustrated with respect to FIGS. 1B and 7, treatment substrate location pixels are selected corresponding to a pixel window centered on a pixel to be printed. The pixel window extends at least one pixel in every direction from the pixel to be printed. The blooming window includes the pixel to be printed.

Referring to FIG. 7, the pixel to be printed in this example is pixel {25}, and the treatment substrate location pixels correspond to the pixels in the cross-hatched region, i.e., pixels {9-13, 16-20, 23-27, 30-34, 37-41}. In the example of FIG. 7, the pixel window of the treatment substrate location is a 5×5 window. It will be understood that the pixel window may be selected with any size suitable for a specific application of examples herein.

At block 604, a sum of pixels within a distance from a substrate location pixel is computed. A sum of pixel values can be computed as illustrated above with respect to FIG. 1B. Pixels within a distance from a substrate location pixel constitute a P×Q window of pixels centered on the substrate location pixels. In some examples herein, P is equal to Q, that is, the pixel window is quadrangular. The window size might be any size suitable for a specific application. Referring to FIG. 6, the pixels within a distance from a substrate location pixel correspond to set of pixels 120 that are chosen as a 3×3 window centered in a substrate location pixel. For each processing step, the blooming window is centered in a different substrate location pixel: in Step I, pixel set 120 is centered on pixel {9}; in Step II, pixel set is centered on pixel {10}, and so on.

As set forth above, determination of treatment to be ejected may be performed based on a metric value computed from pixel values of a set of pixels in the neighborhood of a pixel to be printed. In the example of FIG. 6, the metric used to determine treatment is a sum of pixel values of pixels in the set is a sum of pixel values. It will be understood that in other examples other metrics can be used. In general, the metric is associated with a parameter indicative of how much ink is to be received in a substrate region in the neighborhood of the substrate dot onto which a specific pixel is to be printed (e.g., pixel intensity).

At block 606, it is established whether the sum computed in block 604 is above a threshold level. The threshold level can be selected as illustrated above with respect to FIG. 1B. The threshold level may be selected based on at least one specific print parameter for printing the digital image. For example, parameters such as, but not limited to, specific ink being used, treatment to be applied, or substrate being used can be taken into account for selecting the threshold level. In general, the threshold level is selected so that application of a treatment to a treatment substrate location conveys a substantial effect, e.g., enhancing print quality or durability above a certain level as compared to not applying treatment.

Upon establishing that treatment on a treatment substrate location is to be performed, print control data is generated for applying treatment on the substrate location at block 608 (this is referred to as blooming).

If the computed sum is not above the threshold, flow chart goes to block 610, wherein it is decided whether the sum has been computed for the selected substrate location pixels. If all sums have been computed and none of them is above the threshold, control data is generated at block 612 for not applying treatment to the substrate location at block 612. In other words, control data is generated that will cause a printer not to apply treatment in blooming region of the pixel to be printed.

If there still are substrate location pixels for which the sum of pixels has not been computed, process flow 600 select the next substrate location pixel at block 614 and goes back to block 604. In some examples herein, illustrated with respect to FIG. 7, all substrate location pixels are selected for performing blocks 604 to 614. More specifically, a processing step for evaluating treatment is performed for each substrate location pixel as illustrate in FIG. 7. In that example, the substrate location is comprised of 25 substrate location pixel, and therefore, process flow 600 results in 25 processing steps (Steps I to XXV). In each of these processing steps, the window for summing pixel values is comprised of different set of pixels centered on one substrate location pixel.

The following lists pseudo-code instructions that might be used to generate control data in the example of FIG. 7:

```
IF SUM[{1-3, 8-10, 15-17}] > THRESHOLD, THEN Y=1 // for window
centered on {9}
IF SUM[{2-4, 9-11, 16-18}] > THRESHOLD, THEN Y=1 // for window
centered on {10}
IF SUM[{3-5, 10-12, 17-19}] > THRESHOLD, THEN Y=1 // for window
centered on {11}
IF SUM[{4-6, 11-13, 18-20}] > THRESHOLD, THEN Y=1 // for window
centered on {12}
......
(similar 'IF' instructions for windows centered on other pixels of treatment
substrate location pixels)
........
IF SUM[{33-35, 40-42, 47-49}] > THRESHOLD, THEN Y=1 // for
window on centered {41}
ELSE Y=0
```

In the above pseudo-code, the instructions SUM[{ . . . }] refers to the sum of pixel values of pixels listed in the curly brackets. The parameter Y is used to indicate whether blooming is to be performed with respect to pixel {25}.

Figure 8A:
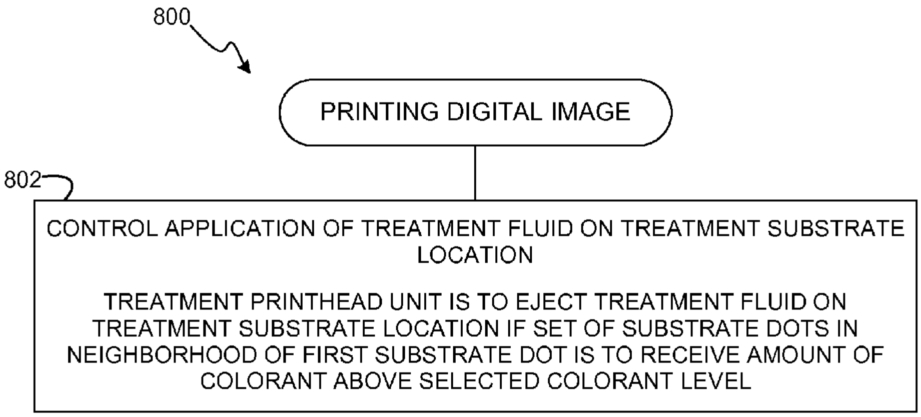
FIG. 8A is a flow chart that implements examples of methods for printing a digital image on a substrate.
Figure 8B:
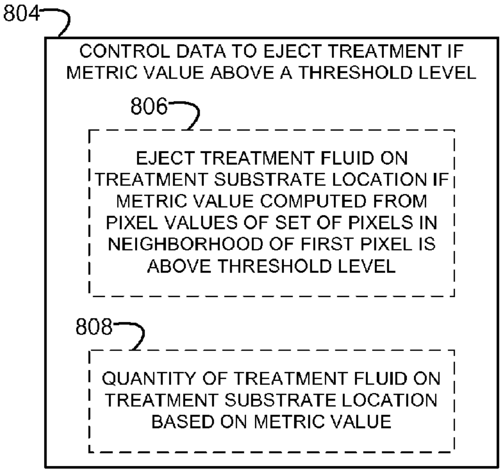
FIG. 8B is a block diagram illustrating control data according to examples herein.

FIG. 8A shows a flow chart 800 that implements examples of methods for printing a digital image on a substrate. Blocks in flow chart 800 may be implemented, for example, by process instructions stored on memory media 204 and executed by processor 104, depicted in FIG. 2. In illustrating flow chart 800, reference is made to elements shown in FIG. 2. It will be understood that FIG. 2 is used merely for illustrative purposes and does not limit printing systems used to execute blocks in flow chart 800.

At block 802 application of treatment fluid is controlled (e.g., by processor 104 shown in FIG. 2) to apply treatment fluid on a treatment substrate location surrounding a substrate dot surrounding a first substrate dot (e.g., treatment substrate location 112*a* surrounding a substrate dot corresponding to pixel {25}, shown in FIG. 1B). Treatment fluid is applied on the treatment substrate location if a set of substrate dots in the neighborhood of the first substrate dot is to receive an amount of colorant above a selected colorant level.

Processor 104 may perform the controlling by processing control data 804 depicted in FIG. 8A. Control data 804 may determine whether treatment fluid is to be applied or not on the treatment substrate location. Control data 804 may also determine the quantity of treatment fluid to be applied. More specifically, control data 804 may include data 806 that determines to eject treatment fluid on the treatment substrate location if a metric value computed from pixel values of a set of pixels in the neighborhood of the first pixel is above a threshold level.

In some examples, control data 804 may include data 808 that determines a quantity of treatment fluid on the treatment substrate location. The quantity of treatment fluid is based on the amount of colorant to be received by the set of substrate dots. For example, the amount of colorant may be inferred, explicitly or implicitly, by using the metric value described above. As set forth above, such a metric value might be a sum of values of pixels within a distance from a treatment substrate location pixel. A computed metric value with respect to a set of pixels in a digital image might be associated with a treatment quantity through a stored look-up table, a mathematical relationship associating the metric with treatment quantity or any other suitable method such as, but not limited to, interpolation.

In the examples above, it was described that a threshold level can be selected based on at least one specific print parameter for printing the digital image. Analogously, a colorant level may also be selected based on at least one specific print parameter for printing the digital image similarly as described above for a threshold level. Moreover, the colorant level may be selected by a selection of a threshold level associated with pixel values. These pixel values are related to colorant amounts to be received by substrate spots corresponding to pixels in the image to be reproduced.

Control data 804 may be to determine operation of a treatment printhead unit, such as treatment printhead unit 246 (used for pre-treatment) and/or pre-treatment printhead unit 248 (used for pre-treatment).

The treatment printhead unit is operated according to control data 804. For example, processor 104 might process control data 105 to operate treatment printhead units 246, 248. Depending on the specific control data, the treatment printhead units are operated to eject or not eject treatment fluid on a specific substrate location. Control data 804 may include control data associated with all pixels to be reproduced in a printjob. Each pixel may be then bloomed or not depending on the control data. A pixel is bloomed if it is determined that the associated treatment substrate location is to receive treatment.

It will be understood that there might be a variety of further blocks for printing a digital image according to examples herein, which are not shown in FIG. 8A for the sake of brevity. For example, flow chart 800 may include blocks for operating ink printheads to reproduce pixels of a digital image on the substrate.

As set forth above, examples herein facilitate reduction of treatment usage with respect to operations in which all pixels in a digital image are bloomed. Further, the reduction of treatment usage might be adjusted by selection of the threshold level used to determine whether a specific metric value accounts for performing blooming. Dependence of treatment usage on selected threshold level is illustrated with respect to FIG. 9.

Figure 9:
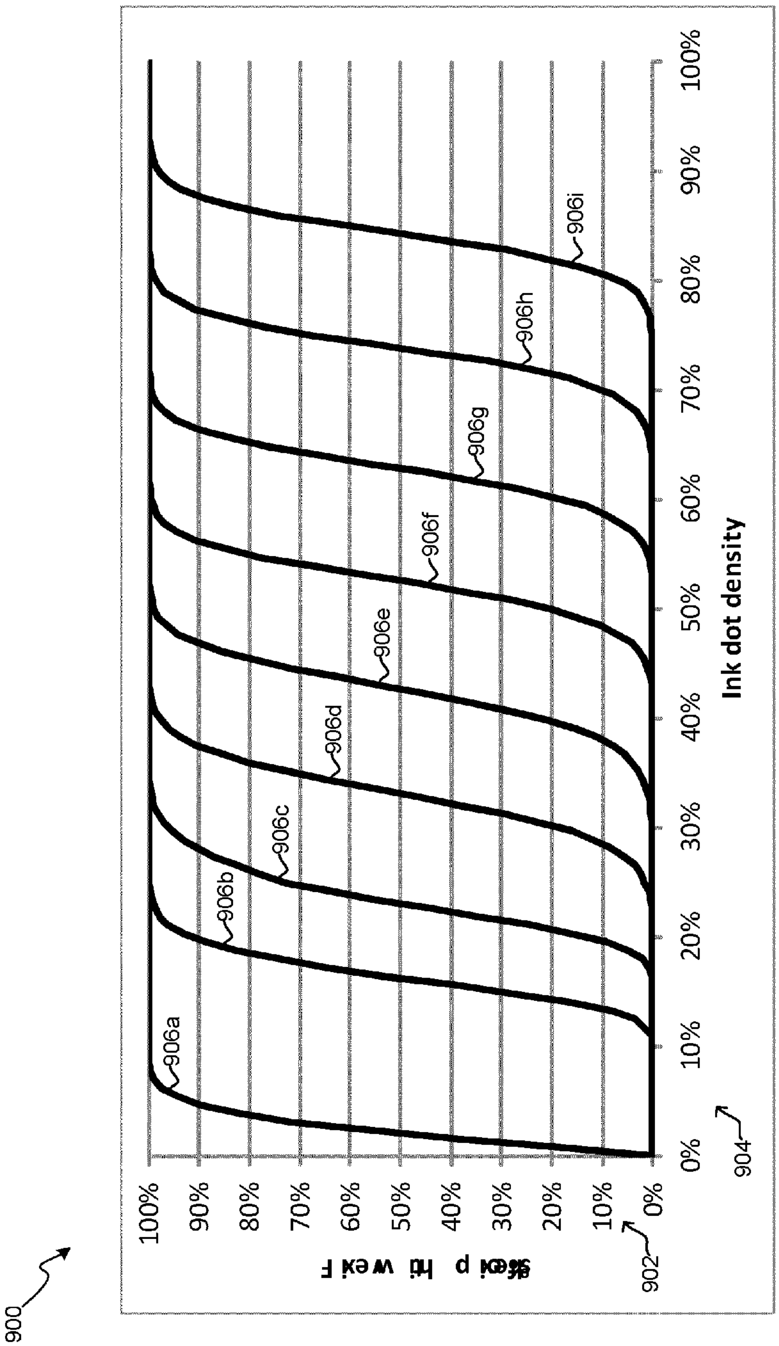
FIG. 9 shows a graph representing a percentage of pixels to be treated versus an ink dot density for some examples of application treatment.

FIG. 9 shows a graph 900 representing a percentage 902 of pixels to be treated versus an ink dot density 904. Graph 900 includes treatment usage curves **906*a* to 906*i*, each treatment usage curve corresponds to a threshold level value: treatment usage curve 906*a* corresponds to a threshold level value of 0, and reproduces a treatment application in which every pixel in an image with a non-zero pixel value is bloomed; treatment usage curve 906*b* corresponds to a threshold level value of 1; treatment usage curve 906*c* corresponds to a threshold level value of 2; treatment usage curve 906*d* corresponds to a threshold level value of 3; treatment usage curve 906*e* corresponds to a threshold level value of 4; treatment usage curve 906*f* corresponds to a threshold level value of 5; treatment usage curve 906*g* corresponds to a threshold level value of 6; treatment usage curve 906*h* corresponds to a threshold level value of 7; and treatment usage curve 906*i*** corresponds to a threshold level value of 8.

Graph 900 illustrates examples in which, for a given ink dot density, increasing the threshold value decreases the number of pixels that are bloomed. As can be observed in graph 800, in these examples when the threshold is 0 even a 10% ink density produces a full fixer blackout. However, when the threshold is higher (e.g. 5) a 60% ink density is required to generate a full blackout (in contrast to the 10% ink density when threshold was 0). In other words, a threshold value can be used to shift treatment usage curves toward the right side of graph 900. Thereby, treatment usage might be eliminated for lower ink dot densities so that treatment usage for printing an image is reduced.

Figure 10A:
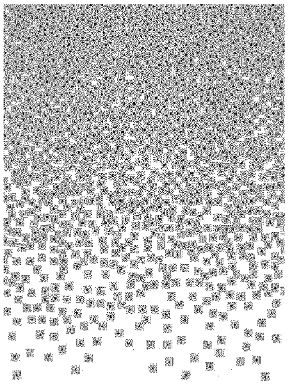
FIGS. 10A to 10E are examples of treatment usage for different threshold levels.
Figure 10B:
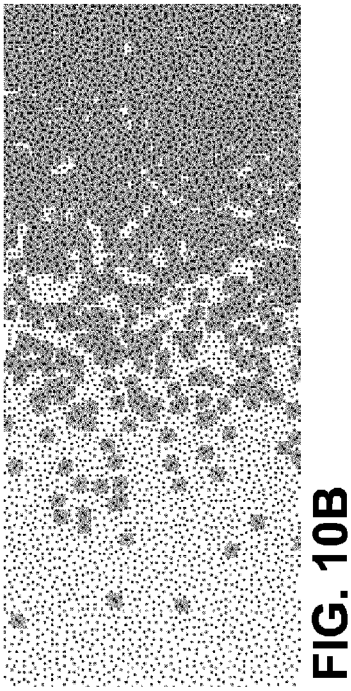
Figure 10C:
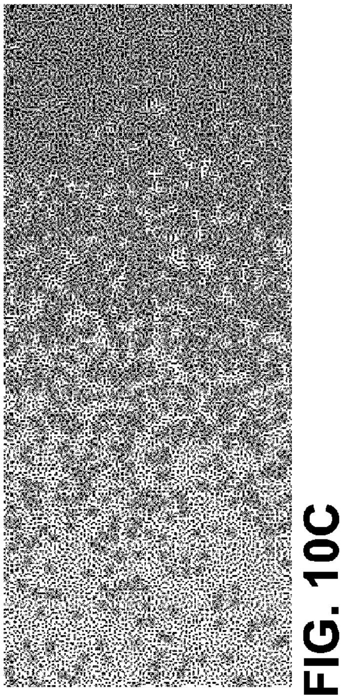
Figure 10D:
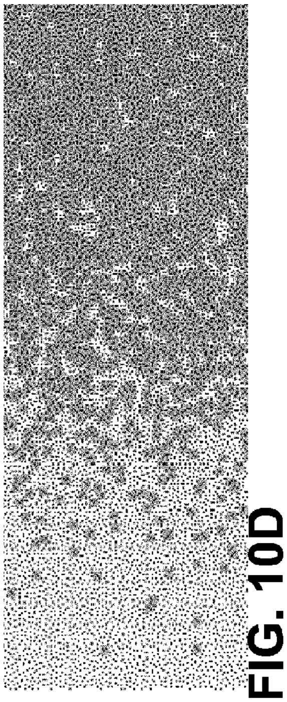
Figure 10E:
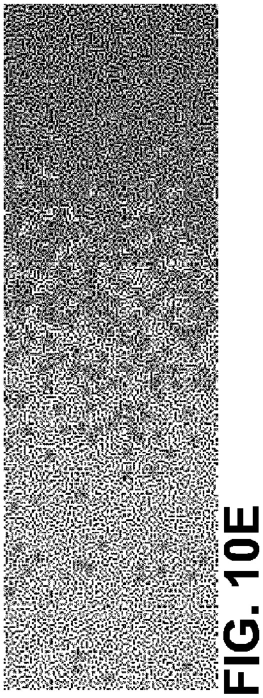

FIGS. 10A to 10E show some examples of treatment usage for different threshold levels. In these Figures, black dots represent black pixels and grey areas represent pixels of treatment substrate locations to receive treatment. FIG. 10A corresponds to a treatment usage determined using a threshold level value of 0 and reproduces a treatment application in which every black pixel is bloomed. FIG. 10B corresponds to a treatment usage determined using a threshold level value of 1. FIG. 10C corresponds to a treatment usage determined using a threshold level value of 2. FIG. 10D corresponds to a treatment usage determined using a threshold level value of 3. FIG. 10E corresponds to a treatment usage determined using a threshold level value of 4. As can be perceived from these Figures, higher threshold levels results in a lower treatment usage for regions corresponding to low black pixel densities.

Figure 11A:
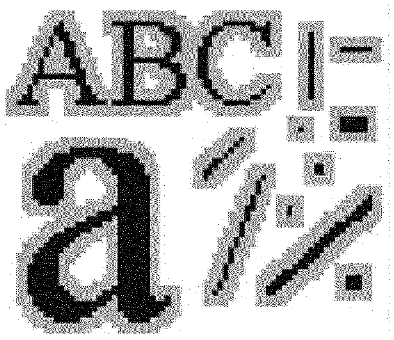
FIGS. 11A to 11E show some examples of treatment usage for different threshold levels with respect to images including text and edges.
Figure 11B:
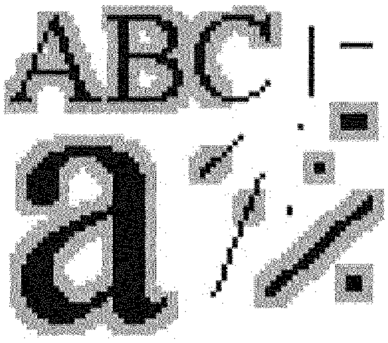
Figure 11C:
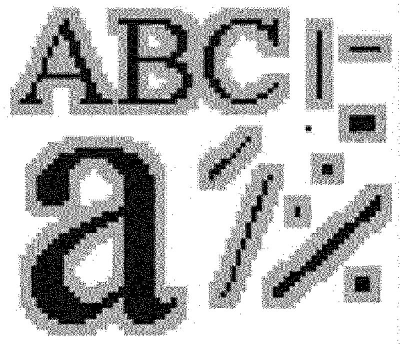
Figure 11D:
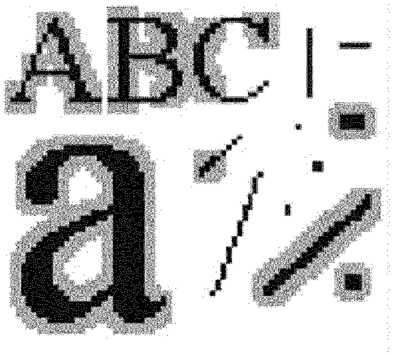
Figure 11E:
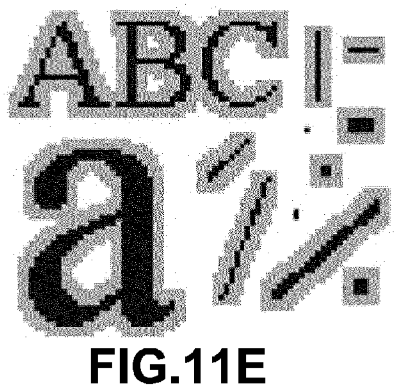

FIGS. 11A to 11E show some examples of treatment usage for different threshold levels with respect to images including text and edges. FIG. 11A corresponds to a treatment usage determined using a threshold level value of 0 and reproduces a treatment application in which every pixel non-zero is bloomed. FIG. 11B corresponds to a treatment usage determined using a threshold level value of 1. FIG. 11C corresponds to a treatment usage determined using a threshold level value of 2. FIG. 11D corresponds to a treatment usage determined using a threshold level value of 3. FIG. 11E corresponds to a treatment usage determined using a threshold level value of 4. As can be observed, with increased threshold values, blooming in not performed for the sharper edges. Threshold levels might be tuned for blooming a substantial part of the edges so that treatment efficiently improves quality of the printed images.

In the foregoing description, numerous details are set forth to provide an understanding of the examples disclosed herein. However, it will be understood that the examples may be practiced without these details. While a limited number of examples have been disclosed, numerous modifications and variations therefrom are contemplated. It is intended that the appended claims cover such modifications and variations. Further, flow charts herein illustrate specific block orders; however, it will be understood that the order of execution may differ from that which is depicted. For example, the order of execution of two or more blocks may be scrambled relative to the order shown. Also, two or more blocks shown in succession may be executed concurrently or with partial concurrence. Further, claims reciting “a” or “an” with respect to a particular element contemplate incorporation of one or more such elements, neither requiring nor excluding two or more such elements. Further, at least the terms “include” and “comprise” are used as open-ended transitions.

What is claimed is:

1. A method of printing by applying a treatment fluid in addition to a printing fluid to form a printed image, the method comprising, with a printhead receiving assembly comprising an ink printhead unit and a treatment fluid printhead unit; and a processor to control the ink printhead unit and the treatment fluid printhead unit:

for each of a number of potential treatment locations, selecting a pixel of a digital image corresponding to the treatment location;

computing a sum of pixel values of a plurality of pixels in a group that is within a predetermined distance from each selected pixel;

determining whether treatment fluid is to be applied on each potential treatment location, wherein treatment fluid is to be applied only when the computed sum is above a threshold level;

generating print control data for applying treatment on the treatment substrate location based on the establishing;

providing control data for applying treatment fluid based on the determining; and based on the control data, selectively applying treatment fluid in conjunction with printing the printed image, wherein the printed image includes a first location corresponding to a first pixel in the digital image, wherein the first location receives colorant and the first pixel is adjacent to second and third pixels in the digital image, where second and third locations corresponding to the second and third pixels do not have colorant and the second location does not receive treatment fluid and the third location does receive treatment fluid.

2. The method of claim 1, wherein the selected pixel has a value indicating no colorant is deposited for that pixel.

3. The method of claim 1, wherein, the group of pixels is square.

4. The method of claim 1, wherein the pixels within a distance from the selected pixel correspond to a pixel window of at least 2×2 pixels.

5. The method of claim 1, wherein the threshold level is nonzero.

6. The method of claim 1, further comprising, for each treatment location where treatment fluid is applied based on the control data, determining a quantity of treatment fluid to apply based on the computed sum of pixel values.

7. The method of claim 1, wherein the treatment fluid is applied to a blooming window extending at least one pixel in every direction around a selected pixel at which the determining determined that treatment fluid would be applied.

8. The method of claim 1, wherein the threshold is selected based on at least one of: an ink for printing the image, a type of the treatment fluid and a substrate receiving the image.

9. A method of printing by selectively applying a treatment fluid in addition to a printing fluid to form a printed image, the method comprising, with a printhead receiving assembly comprising an ink printhead unit and a treatment fluid printhead unit; and a processor to control the ink printhead unit and the treatment fluid printhead unit:

for each of a number of potential treatment locations, select a pixel of a digital image corresponding to that treatment location;

computing a sum of pixel values of a group that is within a predetermined distance from each selected pixel;

for each selected pixel, computing a second sum of pixel values in a second, different pixel set corresponding to the selected pixel;

using a greater of the two computed sums to determine whether treatment fluid is to be applied on the potential treatment location, wherein treatment fluid is applied only when the greater of the two computed sums is above a threshold level;

in response to determining whether treatment fluid is to be applied for each potential treatment location, generating control data accordingly for applying the treatment fluid; and selectively applying the treatment fluid to a medium, wherein the printed images is formed on the medium, the printed image based on the generated control data.

10. The method of claim 9, wherein the selected pixel is in the second pixel set.

* * * * *